(12) United States Patent
Chen et al.

(10) Patent No.: US 9,883,350 B2
(45) Date of Patent: Jan. 30, 2018

(54) POSITIONING METHOD AND DEVICE

(71) Applicant: Xiaomi Inc., Beijing (CN)

(72) Inventors: Hong Chen, Beijing (CN); Ziguang Gao, Beijing (CN); Enxing Hou, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/081,955

(22) Filed: Mar. 28, 2016

(65) Prior Publication Data
US 2016/0345138 A1   Nov. 24, 2016

(30) Foreign Application Priority Data

May 19, 2015 (CN) .......................... 2015 1 0256395

(51) Int. Cl.
*H04W 64/00* (2009.01)
*H04W 4/04* (2009.01)
*G01S 5/02* (2010.01)
*H04B 17/318* (2015.01)

(52) U.S. Cl.
CPC ............ *H04W 4/04* (2013.01); *G01S 5/0252* (2013.01); *H04B 17/318* (2015.01); *H04W 64/00* (2013.01)

(58) Field of Classification Search
None
See application file for complete search history.

(56) References Cited

U.S. PATENT DOCUMENTS

| 2014/0092996 A1 | 4/2014 | Wang |
| 2014/0342754 A1 | 11/2014 | Liu et al. |
| 2015/0201305 A1* | 7/2015 | Edge ..................... H04W 4/021 455/456.3 |

FOREIGN PATENT DOCUMENTS

| CN | 104333846 A | 2/2015 |
| CN | 104471921 A | 3/2015 |
| EP | 2632215 A2 | 8/2013 |
| KR | 101342003 B1 | 12/2013 |
| WO | 2013/128081 A1 | 9/2013 |
| WO | 2014092996 A2 | 6/2014 |
| WO | 2015009438 A1 | 1/2015 |

OTHER PUBLICATIONS

International Search Report for PCT/CN2015/090370.
Extended European Search Report of EP16163274.0.
International Search Report of PCT/CN2015/090370.

* cited by examiner

*Primary Examiner* — Suhail Khan
(74) *Attorney, Agent, or Firm* — Jun He Law Offices P.C.; James J. Zhu

(57) ABSTRACT

A positioning method includes: collecting and analyzing wireless messages sent by at least one wireless device in a current space to obtain a first characteristic pattern associated with the current space; performing a matching process to match the first characteristic pattern to at least one of a plurality of preset characteristic patterns, each of the plurality of preset characteristic patterns being associated with one of a plurality of spaces; obtaining, if the preset characteristic patterns comprise a second characteristic pattern that matches the first characteristic pattern, space information corresponding to the second characteristic pattern; and determining a position of the current space by using the space information corresponding to the second characteristic pattern. Moreover, each characteristic pattern comprises a correspondence between an identifier of each wireless device in a corresponding space and a signal quality of the wireless device.

12 Claims, 6 Drawing Sheets

POSITIONING METHOD AND DEVICE

CROSS-REFERENCE TO RELATED APPLICATIONS

The present application is based on and claims priority to Chinese Patent Application No. 201510256395.6, filed May 19, 2015, the entire contents of which are incorporated herein by reference.

TECHNICAL FIELD

The present disclosure relates to the field of communication, and more particularly, to a positioning method and device.

BACKGROUND

With the popularity of wireless communication technology, more and more wireless smart devices, such as routers, smart phones, Wi-Fi sockets and so on are gradually used in houses. Typically, a house has a plurality of rooms with wireless smart devices in each room, such as a router in the living room, a Wi-Fi socket in the bedroom, and so on. The wireless smart devices in different room can send wireless messages to communicate with each other. In addition, a wireless smart device may periodically broadcast a wireless message. Therefore, each room may be filled with a large number of wireless messages. Some wireless smart devices are fixedly arranged in the room, such as a router, and some wireless smart devices may be movable into each room or movable between several rooms at any time, such as smart phones.

SUMMARY

According to a first aspect of the embodiments of the present disclosure, there is provided a positioning method. The positioning method includes: collecting and analyzing wireless messages sent by at least one wireless device in a current space to obtain a first characteristic pattern associated with the current space; performing a matching process to match the first characteristic pattern to at least one of a plurality of preset characteristic patterns, each of the plurality of preset characteristic patterns being associated with one of a plurality of spaces; obtaining, if the preset characteristic patterns comprise a second characteristic pattern that matches the first characteristic pattern, space information corresponding to the second characteristic pattern; and determining a position of the current space by using the space information corresponding to the second characteristic pattern. Moreover, each characteristic pattern comprises a correspondence between an identifier of each wireless device in a corresponding space and a signal quality of the wireless device.

According to a second aspect of the embodiments of the present disclosure, there is provided a smart device. The smart device includes: a processor, and a memory for storing instructions executable by the processor, wherein the processor is configured to perform: collecting and analyzing wireless messages sent by at least one wireless device in a current space to obtain a first characteristic pattern associated with the current space; performing a matching process to match the first characteristic pattern to at least one of a plurality of preset characteristic patterns, each of the plurality of preset characteristic patterns being associated with one of a plurality of spaces; obtaining, if the preset characteristic patterns comprise a second characteristic pattern that matches the first characteristic pattern, space information corresponding to the second characteristic pattern; and determining a position of the current space by using the space information corresponding to the second characteristic pattern. Moreover, each characteristic pattern comprises a correspondence between an identifier of each wireless device in a corresponding space and a signal quality of the wireless device.

According to a third aspect of the embodiment of the present disclosure, there is provided a non-transitory computer-readable storage medium storing instructions, executable by a processor in a smart device, for performing a positioning method. The positioning method includes: collecting and analyzing wireless messages sent by at least one wireless device in a current space to obtain a first characteristic pattern associated with the current space; performing a matching process to match the first characteristic pattern to at least one of a plurality of preset characteristic patterns, each of the plurality of preset characteristic patterns being associated with one of a plurality of spaces; obtaining, if the preset characteristic patterns comprise a second characteristic pattern that matches the first characteristic pattern, space information corresponding to the second characteristic pattern; and determining a position of the current space by using the space information corresponding to the second characteristic pattern. Moreover, each characteristic pattern comprises a correspondence between an identifier of each wireless device in a corresponding space and a signal quality of the wireless device.

It will be appreciated that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
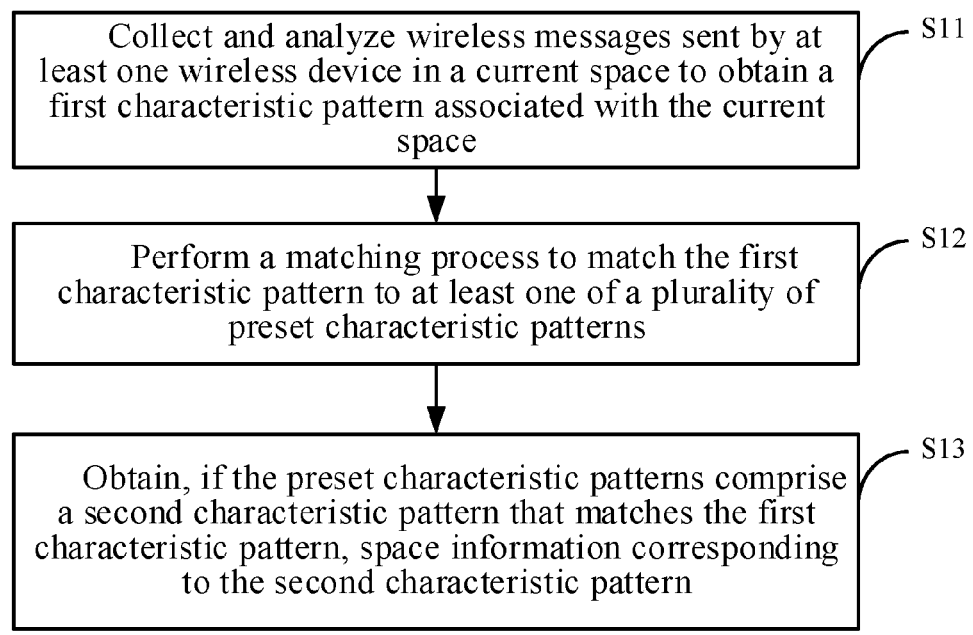
FIG. 1 is a flow chart of a positioning method according to an exemplary embodiment.

FIG. 1 is a flow chart of a positioning method according to an exemplary embodiment. As shown in FIG. 1, the method is used in a smart device, such as a terminal device. The method includes the following steps.

In step S11, wireless messages sent by at least one wireless device in a current space are collected and analyzed to obtain a first characteristic pattern associated with the current space.

In this embodiment, optionally, the current space means a space in which the terminal device currently locates and can be any place covered by a wireless LAN. The wireless LAN may be one dedicated for home use, usually covering a plurality of spaces, such as spaces of bedrooms, a living room, a study, a dining room and so on. Optionally, there are also a plurality of wireless devices, fixedly or movably freely, in the respective spaces covered by the wireless LAN. The wireless devices include, but not limited to: routers, smart phones, notebook computers, tablet PCs and so on.

In step S12, a matching process is performed to match the first characteristic pattern to at least one of a plurality of preset characteristic patterns. Herein each of the plurality of preset characteristic patterns is associated with one of the plurality of spaces.

Optionally, the characteristic patterns of the plurality of spaces, such as all the spaces covered by the wireless LAN, are generated in advance. In this embodiment, each generated characteristic pattern is unique, i.e. different from each other. Optionally, space information such as a space number, and the like is stored in the characteristic pattern to facilitate obtaining the space information after performing the matching process.

In this embodiment, the terminal device may be any kind of terminal device capable of receiving a wireless message and analyzing the wireless message, including, but not limited to: sniffer, smart phones, and so on. The way that terminal device analyzes the wireless message may include but not limited to: extracting a MAC (Media Access Control) address from a wireless message sent by a wireless device, and obtaining a RSSI (Received Signal Strength Indication) of the wireless message, etc. The wireless messages can be those sent between the wireless devices, or those periodically broadcasted by a wireless device according to requirements of communication protocols.

The RSSI reflects a signal strength of a wireless device. When the RSSI is high in numerical value, it means the wireless device receives a strong signal, and when the RSSI is low in numerical value, it means that the wireless device receives a weak signal.

In step S13, if it is determined that the preset characteristic patterns comprise a second characteristic pattern that matches the first characteristic pattern, space information corresponding to the second characteristic pattern is obtained. Moreover, a position of the current space by using the space information corresponding to the second characteristic pattern is determined.

The spatial information may include identification information of a space, such as a space number, for facilitating the user to know which space covered by the wireless LAN is currently entered by the terminal, so as to realize space positioning.

In this embodiment, for example, if the user enters into a space (such as a living room or a study) with carrying the terminal device, the space the user enters into is recognized as the "current space". Then the terminal device may identify the position of the current space by implementing the positioning method as described in this embodiment to determine the position of the current space. Then, optionally, an action can also be triggered correspondingly based on the recognized position of the current space, such as automatically opening the speaker if it is determined that a living room is entered (which means that the current space is determined as the living room), or automatically opening a ZigBee bulb if it is determined that a study is entered (which means that the current space is determined as the study). The corresponding action can be triggered by the terminal device, which is capable of triggering a corresponding action besides receiving and analyzing a wireless message. Alternatively, actions can also be triggered by other smart devices which receive notices from the terminal device. The terminal device is capable of receiving, analyzing a wireless message, and prompting the other smart devices which space is currently entered, so as to enable the other smart devices to trigger corresponding actions based on the promp of the terminal device.

In this embodiment, optionally, any characteristic pattern may include a correspondence between an identifier and a signal quality of a wireless device in a corresponding space. Optionally, the identifier of the wireless device may be a MAC address, and the signal quality of the wireless device may be a RSSI. The wireless device within a special characteristic pattern is a wireless device whose signal can be received by the terminal device when the terminal device is located in the corresponding space associated with the special characteristic pattern. Therefore, the wireless device within the special characteristic pattern can either be a wireless device located within the special space or a wireless device located within other spaces. For example, the characteristic pattern associated with an exemplary space includes correspondences between the identifiers and signal quality of three wireless devices, wherein two of which are located within the exemplary space, and the other one is located within a space adjacent to the exemplary space.

In this embodiment, optionally, the step of performing the matching process to match the first characteristic pattern to at least one of a plurality of preset characteristic patterns includes the following steps.

With respect to each characteristic pattern associated with each space of the plurality of spaces, each characteristic pattern is compared with the first characteristic pattern, and if the second characteristic pattern comprises identifiers of all the wireless devices in the current space and signal quality of the wireless devices in the first characteristic pattern is similar to that of wireless devices in the second characteristic pattern, it is determined that the second characteristic pattern associated with a second space matches the first characteristic pattern.

In this embodiment, optionally, it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

In this embodiment, optionally, the above method further comprises the following steps to create the characteristic pattern for each space.

With respect to each space of the plurality of spaces, wireless messages received from each wireless device are collected, and then analyzed to obtain a MAC address and a RSSI of each wireless device, and a correspondence between the MAC address and RSSI of each wireless device is established to obtain the characteristic pattern for each space.

In this embodiment, optionally, the wireless messages received from each wireless device are collected multiple times to obtain a multiple of RRSIs for each wireless device, and the multiple of RRSIs are grouped as a RRSI range for each wireless device.

In the method provided in the present embodiment, by collecting and analyzing wireless messages sent by at least one wireless device in a current space, a first characteristic pattern associated with the current space is obtained. Further, by performing a matching process to match the first characteristic pattern to at least one of a plurality of preset characteristic patterns, a second characteristic pattern that matches the first characteristic pattern is determined and then space information corresponding to the second characteristic pattern is obtained. Moreover, a position of the current space is then determined by using the space information corresponding to the second characteristic pattern, thus achieving automatic space positioning. This is an effective solution for automatically identifying a space currently entered.

Figure 2:
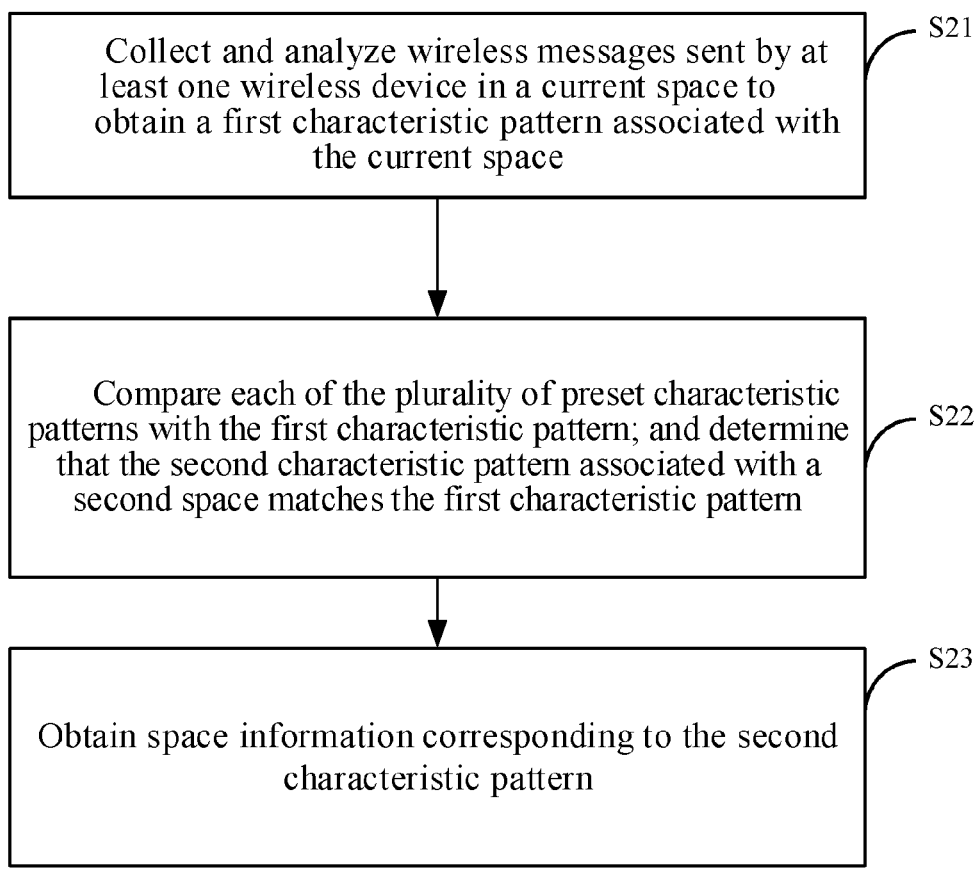
FIG. 2 is a flow chart of another positioning method according to exemplary embodiment.

FIG. 2 is a flow chart of a positioning method according to another exemplary embodiment. As shown in FIG. 2, the method is used in a terminal device and includes the following steps.

In step S21, wireless messages sent by at least one wireless device in a current space are collected and analyzed to obtain a first characteristic pattern associated with the current space.

The current space means a space where the terminal device currently locates and is covered by a wireless LAN. The wireless LAN may cover a plurality of spaces. Each of the plurality of spaces has a characteristic pattern including a correspondence between an identifier and a signal quality of a wireless device. Each of the plurality of spaces may be provided with one or more wireless devices, not limited here. For example, in a user's house, the living room is provided with a router, a TV, a Wi-Fi camera, the bedrooms with Wi-Fi air conditioners, Bluetooth voice boxes, ZigBee bulbs, etc. Herein, the living room is adjacent to the bedrooms, signals sent from wireless devices in the bedrooms can be received even in the living room. Therefore, the characteristic pattern associated with the living room includes not only a correspondence between an identifier and a signal quality of the router, a correspondence between an identifier and a signal quality of the TV, a correspondence between an identifier and a signal quality of the Wi-Fi camera, but also a correspondence between an identifier and a signal quality of the bluetooth boxes, a correspondence between an identifier and a signal quality of the Zigbee bulbs, with signal quality of these wireless devices in the bedrooms weaker than that in the living room in the characteristic pattern.

Optionally, the first characteristic pattern associated with the current space may include a correspondence between an identifier of each wireless device in the current space and a signal quality of the corresponding wireless device.

In step 22, with respect to each characteristic pattern associated with each space of the plurality of spaces, each characteristic pattern is compared with the first characteristic pattern, and if the second characteristic pattern comprises identifiers of all the wireless devices in the current space and signal quality of the wireless devices in the first characteristic pattern is similar to that of wireless devices in the second characteristic pattern, it is determined that the second characteristic pattern associated with a second space matches the first characteristic pattern.

The number of wireless devices of the second characteristic pattern may be equal or greater than that in the first characteristic pattern. For example, the second characteristic pattern may include five wireless devices corresponding respectively to No. 1-5, and the first characteristic pattern may include four wireless devices corresponding respectively to No. 1-4. The signal of the wireless device NO. 5 may be too weak to be received by the terminal device.

In this embodiment, optionally, it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

The predesignated number may be preset according to needs in advance, such as 2, 3 or 5, etc., not limited here.

In this embodiment, optionally, each of the plurality of characteristic patterns includes an identifier of a wireless device and a range of signal quality corresponding to the identifier. The smallest number for N is 1, and the largest number is a total number of all the wireless devices in the first characteristic pattern. If the signal quality of all the wireless devices in the first characteristic pattern falls within a signal quality range of the corresponding wireless devices in the second characteristic pattern, the position result is very precise.

For example, the second characteristic pattern includes identifiers for 3 wireless devices and their corresponding ranges of signal quality, and the first characteristic pattern includes identifiers for 3 wireless devices and their corresponding ranges of signal quality. The identifiers in the first characteristic pattern are as same as the identifiers in the second characteristic pattern. In case of the predesignated number being 3, if the signal quality of each of the three wireless devices in the first characteristic pattern falls within a signal quality range of the corresponding wireless device in the second characteristic pattern, it is determined that the second characteristic pattern matches the first characteristic pattern. In case of the predesignated number being 2, if the signal quality of each of the two wireless devices in the first characteristic pattern falls within a signal quality range of the corresponding wireless device in the second characteristic pattern, it is determined that the second characteristic pattern matches the first characteristic pattern.

In step S23, if it is determined that the preset characteristic patterns comprise a second characteristic pattern that matches the first characteristic pattern, space information corresponding to the second characteristic pattern is obtained. Moreover, a position of the current space by using the space information corresponding to the second characteristic pattern is determined.

In this embodiment, optionally, this method may include the following steps.

With respect to each of the plurality of spaces, wireless messages received from each wireless device are collected, the wireless messages then are analyzed to obtain a MAC address and a RSSI of each wireless device, and a correspondence between the MAC address and RSSI of each wireless device is created to obtain the characteristic pattern for each space.

Optionally, the wireless messages received from each wireless device are collected multiple times to obtain a multiple of RRSIs for each wireless device, and the multiple of RRSIs are grouped as a RRSI range for each wireless device.

Figure 3:
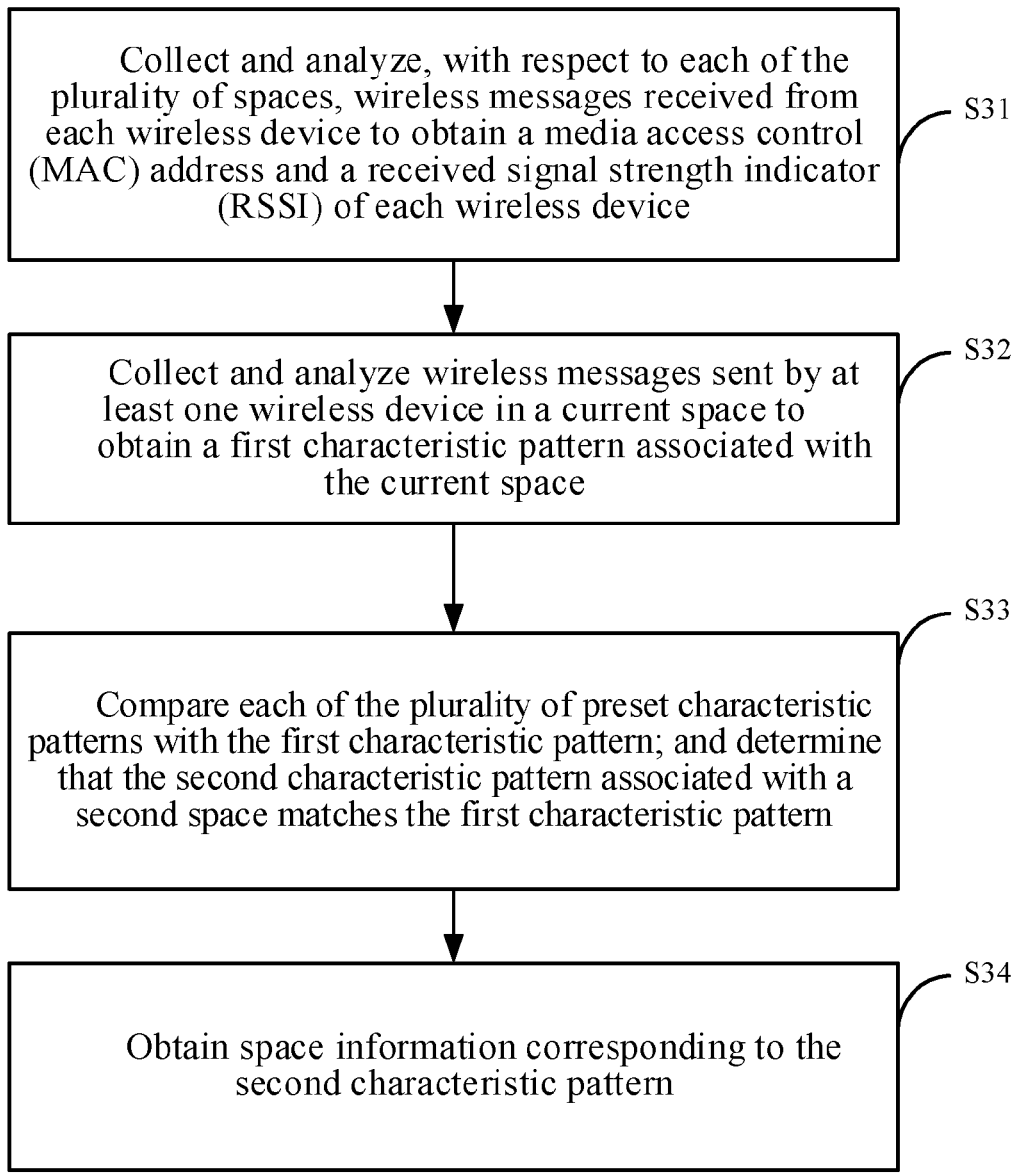
FIG. 3 is a flow chart of a further positioning method according to exemplary embodiment.

FIG. 3 is a flow chart of a further positioning method according to another exemplary embodiment. As shown in FIG. 3, the method is used in a terminal device and includes the following steps.

In step S31, with respect to each space of the plurality of spaces, wireless messages received from each wireless device are collected, the wireless messages then are analyzed to obtain a MAC address and a RSSI of each wireless device, and a correspondence between MAC address and RSSI of each wireless device is established to obtain the characteristic pattern for each space.

The plurality of spaces may be ones covered by wireless LAN.

Optionally, the wireless messages received from each wireless device are collected multiple times to obtain a multiple of RRSIs for each wireless device, and the multiple of RRSIs are grouped as a RRSI range for each wireless device.

For example, RSSIs obtained by 2 times of collections for a wireless device is −60 dbm and −70 dbm respectively, so a range of signal quality is [−70 dbm, −60 dbm].

Optionally, in case that there are a plurality of collected signal quality, the largest one and the smallest one may be selected to make up a range of signal quality, not limited here in this embodiment.

In step S32, wireless messages sent by at least one wireless device in a current space are collected and analyzed to obtain a first characteristic pattern associated with the current space.

The first characteristic pattern may include a correspondence between a wireless device's MAC address and RSSI. Optionally, the first characteristic pattern may include one or more wireless devices located in current space or other spaces.

In step S33, with respect to a characteristic pattern associated with each space of the plurality of spaces, a comparison is performed between each of the plurality of the characteristic patterns and the first characteristic pattern, and if the second characteristic pattern comprises identifiers of all the wireless devices in the current space and signal quality of the wireless devices in the first characteristic pattern is similar to that of wireless devices in the second characteristic pattern, it is determined that the second characteristic pattern associated with a second space matches the first characteristic pattern.

Optionally, it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

In step S34, if it is determined that the preset characteristic patterns comprise a second characteristic pattern that matches the first characteristic pattern, space information corresponding to the second characteristic pattern is obtained. Moreover, a position of the current space by using the space information corresponding to the second characteristic pattern is determined.

Figure 4:
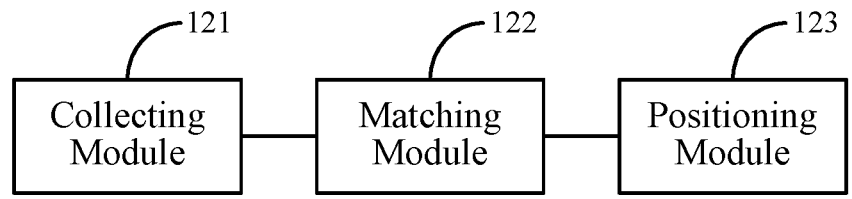
FIG. 4 is a block diagram of a positioning device according to an exemplary embodiment.

FIG. 4 is a block diagram of a positioning device according to an exemplary embodiment. Referring to FIG. 4, the device may include a collecting module 121, a matching module 122, and a positioning module 123.

The collecting module 121 is configured to collect and analyze wireless messages sent by at least one wireless device in a current space to obtain a first characteristic pattern associated with the current space.

The matching module 122 is configured to perform a matching process to match the first characteristic pattern to at least one of a plurality of preset characteristic patterns. Herein each of the plurality of preset characteristic patterns is associated with one of a plurality of spaces.

The positioning module 123 is configured to obtain space information corresponding to the second characteristic pattern and determine a position of the current space by using the space information corresponding to the second characteristic pattern, if the preset characteristic patterns comprise a second characteristic pattern that matches the first characteristic pattern.

In this embodiment, optionally, each characteristic pattern comprises a correspondence between an identifier of each wireless device in a corresponding space and a signal quality of the wireless device.

Figure 5:
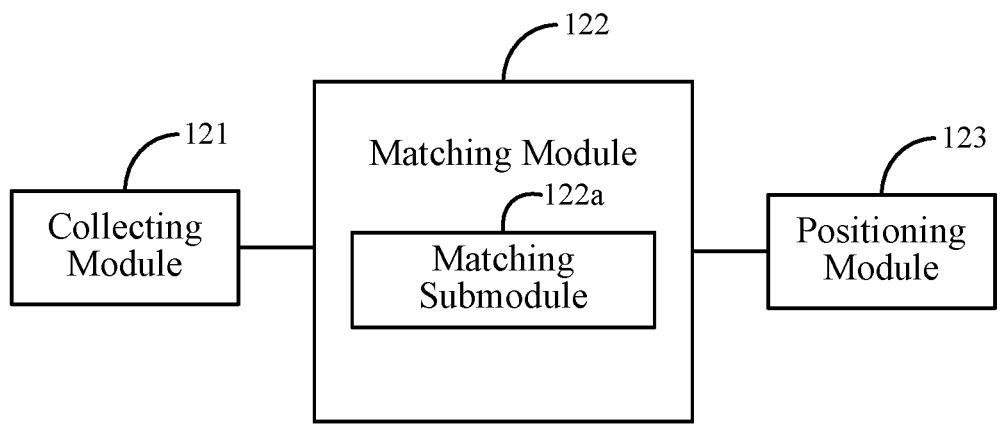
FIG. 5 is a block diagram of another positioning device according to an exemplary embodiment.

Referring to FIG. 5, in this embodiment, optionally, the matching module 122 includes the following submodules.

A matching submodule 122a is configured to compare each of the plurality of preset characteristic patterns with the first characteristic pattern; and determine that the second characteristic pattern associated with a second space matches the first characteristic pattern, if the second characteristic pattern comprises identifiers of all the wireless devices in the current space and signal quality of the wireless devices in the first characteristic pattern is similar to that of wireless devices in the second characteristic pattern.

Figure 6:
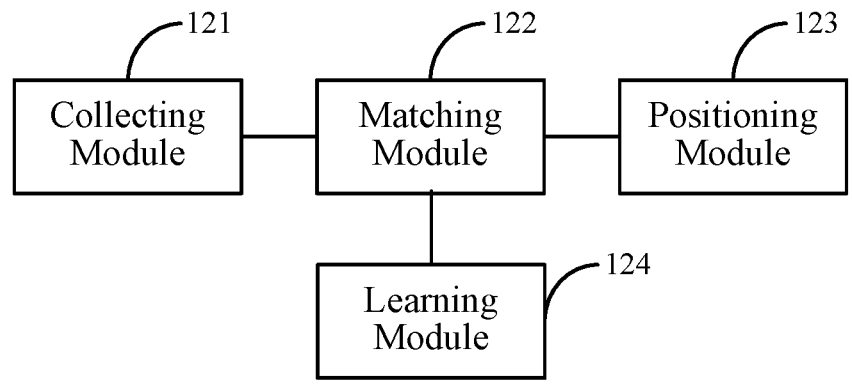
FIG. 6 is a block diagram of further positioning device according to an exemplary embodiment.

Referring to FIG. 6, in this embodiment, optionally, the positioning device may further include the following modules.

A learning module 124 is configured to collect and analyze, with respect to each space of the plurality of spaces, wireless messages received from each wireless device to obtain a MAC address and a RSSI of each wireless device so as to create correspondence between MAC address and RSSI of each wireless device to obtain the characteristic pattern for each space.

In this embodiment, optionally, the learning module 124 is configured to collect the wireless messages received from each wireless device multiple times to obtain a multiple of RRSIs for each wireless device. Herein the multiple of RRSIs are grouped as a RRSI range for each wireless device.

With regard to the devices in the above embodiments, the particular implementations that the above modules and submodules perform have been detailed in the related method embodiments, not describe with details here.

Figure 7:
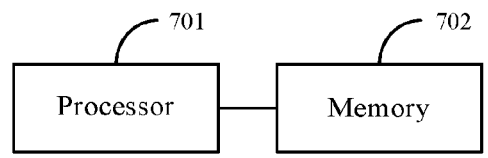
FIG. 7 is a block diagram of a smart device according to an exemplary embodiment.

FIG. 7 is a block diagram of a smart device according to an exemplary embodiment. Referring to FIG. 7, the positioning device may include a processor 701 and a memory 702 for storing instructions executable by the processor. The processor 701 may be configured to perform all of the methods provided in any of the above embodiments.

Figure 8:
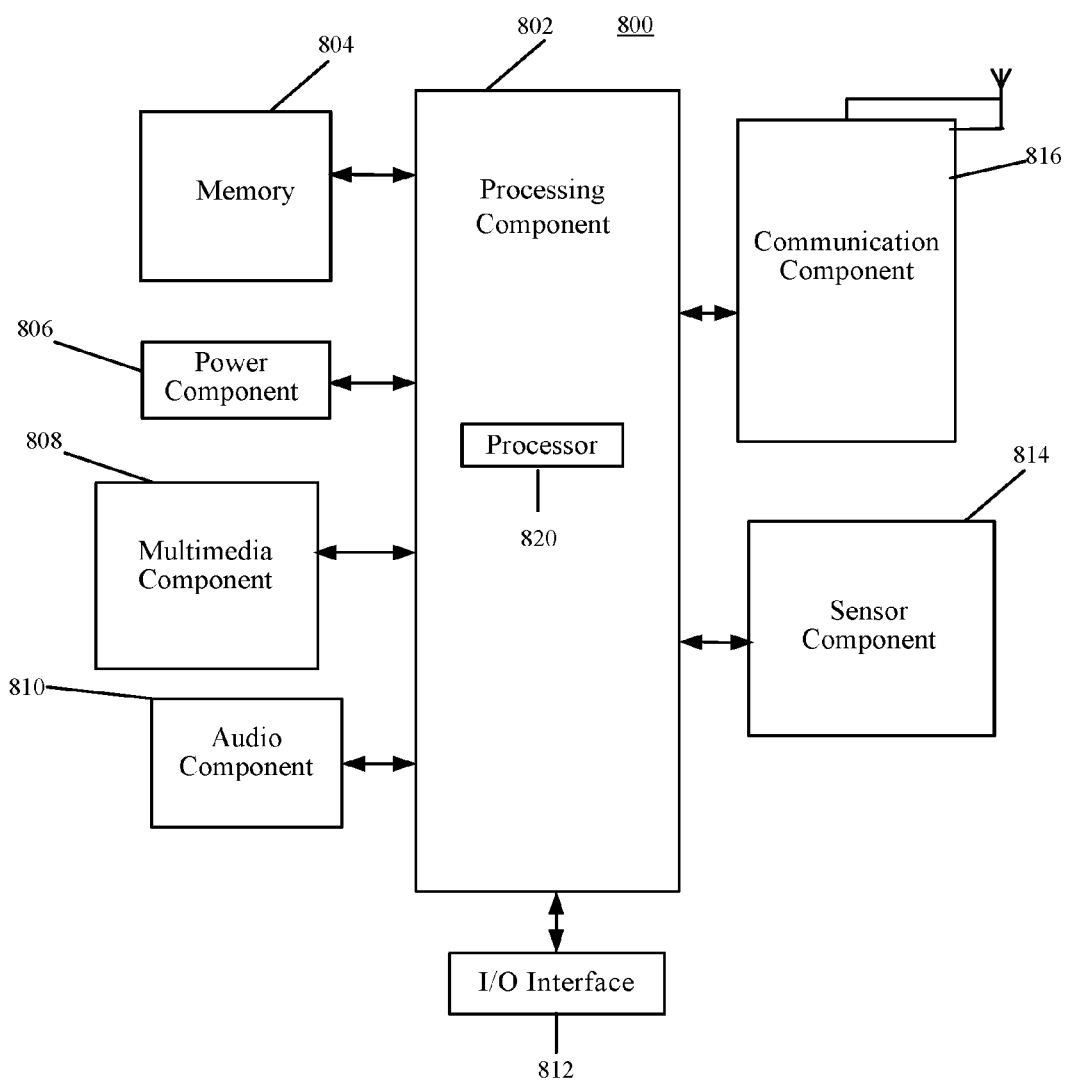
FIG. 8 is a block diagram of another smart device according to an exemplary embodiment.

FIG. 8 is a block diagram of another smart device 800 according to an exemplary embodiment. For example, the device 800 may be a mobile telephone, a computer, a digital broadcasting terminal, a message transceiver device, a games console, a tablet device, a medical device, a fitness facility, a PDA (personal digital assistant) and the like.

Referring to FIG. 8, the device 800 may include one or more of the following components: a processor component 802, a memory 804, a power supply component 806, a multimedia component 808, an audio component 810, an input/output (I/O) interface 812, a sensor component 814 and a communication component 816.

The processor component 802 typically controls overall operations of the device 800, such as the operations associated with display, telephone calls, data communications, camera operations, and recording operations. The processor component 802 may include one or more processors 820 to execute instructions to perform all or part of steps in the above described methods. Moreover, the processor component 802 may include one or more modules which facilitate the interaction between the processor component 802 and other components. For instance, the processor component 802 may include a multimedia module to facilitate the interaction between the multimedia component 808 and the processor component 802.

The memory 804 is configured to store various types of data to support the operation of the device 800. Examples of such data include instructions for any applications or methods operated on the device 800, contact data, phonebook data, messages, pictures and videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 806 provides power to various components of the device 800. The power supply component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes a touch panel, the screen may be implemented as a touch screen to receive input signal from users. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes front camera and/or a rear camera. The front camera and the rear camera may receive an external multimedia datum while the device 800 is in an operation mode, such as a photographing mode or a video mode. Each of the front camera and the rear camera may be a fixed optical lens system or may have focus and optical zoom capability.

The audio component 810 is configured to output and/or input audio signals. For example, the audio component 810 includes a microphone (MIC) configured to receive external audio signals when the device 800 is in an operation mode such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processor component 802 and peripheral interface modules, such as a keyboard, a click wheel and buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect open/closed statuses of the device 800, and relative positioning of components, such as the display and the keypad. The sensor component 814 may also detect position changes of the device 800 or its components, presence or absence of user contact with the device 800, orientation or acceleration/deceleration of the device 800, and temperature changes of the device 800. The sensor component 814 may further include a proximity sensor configured to detect the presence of nearby objects without any physical contact. Moreover, the sensor component 814 may include a light sensor, for example, a CMOS or CCD image sensor, for use in imaging applications. In some embodiments, the sensor component 814 may also include an acceleration sensor, a gyro sensor, a magnetic sensor, a pressure sensor, or a temperature sensor.

The communication component 816 is configured to facilitate wired communication or wireless communication between the device 800 and other equipment. The device 800 can access a wireless network based on communication standards, such as WiFi, 2G, 3G, or a combination thereof. In one exemplary embodiment, the communication component 816 receives a broadcast signal or broadcast related information from an external broadcast management system via a broadcast channel. In another exemplary embodiment, the communication component 816 further includes a near-field communication (NFC) module to facilitate short-range communications. The NFC module, for example, may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium storing instructions, such as stored in the memory 704, executable by the processor 720 in the device 700, for performing the above-described methods. For example, the non-transitory computer-readable storage medium may be a ROM, a random access memory (RAM), a CD-ROM, a magnetic tape, a floppy disc, an optical data storage device, and the like.

A non-transitory computer-readable storage medium is provided. Instructions in the storage medium are executable by a processor of a smart device so that the smart device may perform the above method provided in any of the above embodiments.

Figure 9:
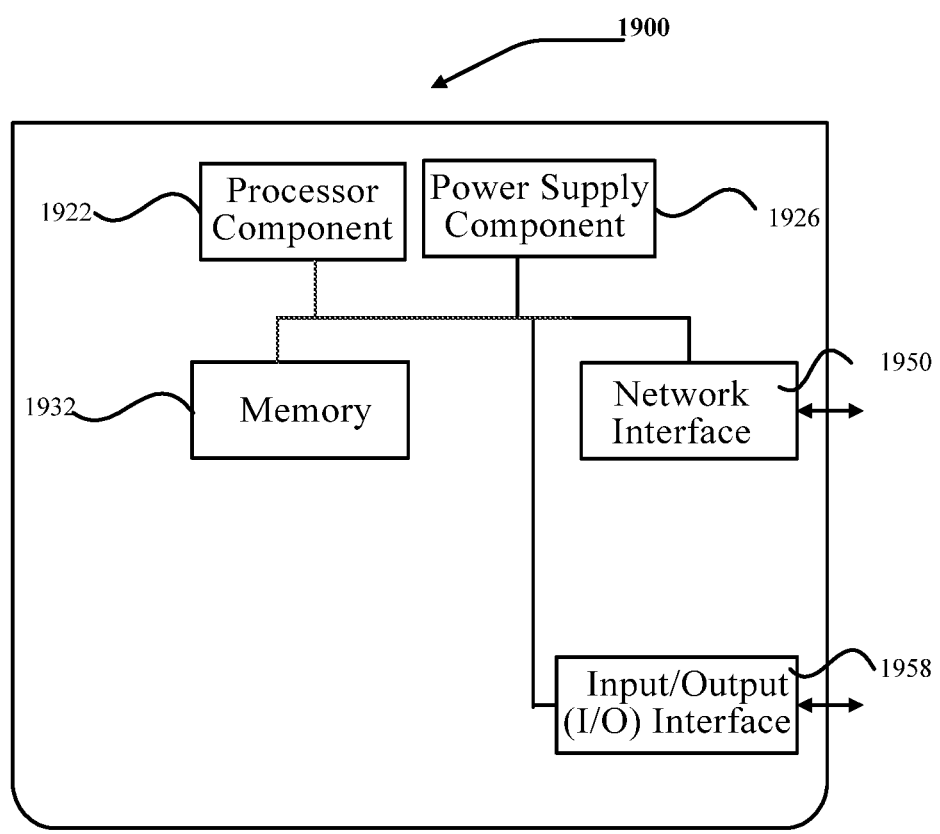
FIG. 9 is a block diagram of a further smart device according to an exemplary embodiment.

FIG. 9 is a block diagram of a further smart device 1900 according to an exemplary embodiment. For example, the device 1900 may be provided as a server. Referring to FIG. 9, the device 1900 includes a processor component 1922 that further includes one or more processors, and memory resources represented by a memory 1932 for storing instructions executable by the processing component 1922. The application programs stored in the memory 1932 may include one or more modules each corresponding to a set of instructions. Further, the processor component 1922 is configured to execute instructions to perform the above described method provided in any of the above embodiments.

The device 1900 may also include a power supply component 1926 configured to perform power management of the device 1900, wired or wireless network interface(s) 1950 configured to connect the device 1900 to a network, and an input/output (I/O) interface 1958. The device 1900 may operate based on an operating system stored in the memory 832, such as Windows Server™, Mac OS X™, Unix™, Linux™, FreeBSD™, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A positioning method, applied to a smart device, the method comprising:
    collecting and analyzing wireless messages sent by at least one wireless device in a current space to obtain a first characteristic pattern associated with the current space;
    performing a matching process to match the first characteristic pattern to at least one of a plurality of preset characteristic patterns, each of the plurality of preset characteristic patterns being associated with one of a plurality of spaces;
    obtaining, if the preset characteristic patterns comprise a second characteristic pattern that matches the first characteristic pattern, space information corresponding to the second characteristic pattern; and
    determining a position of the current space by using the space information corresponding to the second characteristic pattern,
    wherein each characteristic pattern comprises a correspondence between an identifier of each wireless device in a corresponding space and a signal quality of the wireless device; and
    wherein performing the matching process to match the first characteristic pattern to at least one of the plurality of preset characteristic patterns comprises:
        comparing each of the plurality of preset characteristic patterns with the first characteristic pattern; and
        determining that the second characteristic pattern associated with a second space matches the first characteristic pattern, if the second characteristic pattern comprises identifiers of all the wireless devices in the current space and signal quality of the wireless devices in the first characteristic pattern is similar to that of wireless devices in the second characteristic pattern.

2. The positioning method of claim 1, wherein it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

3. The positioning method of claim 1, further comprising:
    collecting and analyzing, with respect to each of the plurality of spaces, wireless messages received from each wireless device to obtain a media access control (MAC) address and a received signal strength indicator (RSSI) of each wireless device; and
    creating a correspondence between the MAC address and RSSI of each wireless device to obtain the characteristic pattern for each space.

4. The positioning method of claim 3, wherein the wireless messages received from each wireless device are collected multiple times to obtain a multiple of RRSIs for each wireless device, and the multiple of RRSIs are grouped as a RRSI range for each wireless device.

5. A smart device, comprising:
    a processor, and
    a memory for storing instructions executable by the processor,
    wherein the processor is configured to perform:
    collecting and analyzing wireless messages sent by at least one wireless device in a current space to obtain a first characteristic pattern associated with the current space;
    performing a matching process to match the first characteristic pattern to at least one of a plurality of preset characteristic patterns, each of the plurality of preset characteristic patterns being associated with one of a plurality of spaces;
    obtaining, if the preset characteristic patterns comprise a second characteristic pattern that matches the first characteristic pattern, space information corresponding to the second characteristic pattern; and
    determining a position of the current space by using the space information corresponding to the second characteristic pattern,
    wherein each characteristic pattern comprises a correspondence between an identifier of each wireless device in a corresponding space and a signal quality of the wireless device; and
    wherein performing the matching process to match the first characteristic pattern to at least one of the plurality of preset characteristic patterns comprises:
        comparing each of the plurality of preset characteristic patterns with the first characteristic pattern; and
        determining that the second characteristic pattern associated with a second space matches the first characteristic pattern, if the second characteristic pattern comprises identifiers of all the wireless devices in the current space and signal quality of the wireless devices in the first characteristic pattern is similar to that of wireless devices in the second characteristic pattern.

6. The smart device of claim 5, wherein it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

7. The smart device of claim 5, wherein the processor is further configured to perform:
   collecting and analyzing, with respect to each of the plurality of spaces, wireless messages received from each wireless device to obtain a media access control (MAC) address and a received signal strength indicator (RSSI) of each wireless device; and
   creating a correspondence between the MAC address and RSSI of each wireless device to obtain the characteristic pattern for each space.

8. The smart device of claim 7, wherein the wireless messages received from each wireless device are collected multiple times to obtain a multiple of RRSIs for each wireless device, and the multiple of RRSIs are grouped as a RRSI range for each wireless device.

9. A non-transitory computer-readable storage medium storing instructions, executable by a processor in a smart device, for performing a positioning method, the method comprising:
   collecting and analyzing wireless messages sent by at least one wireless device in a current space to obtain a first characteristic pattern associated with the current space;
   performing a matching process to match the first characteristic pattern to at least one of a plurality of preset characteristic patterns, each of the plurality of preset characteristic patterns being associated with one of a plurality of spaces;
   obtaining, if the preset characteristic patterns comprise a second characteristic pattern that matches the first characteristic pattern, space information corresponding to the second characteristic pattern; and
   determining a position of the current space by using the space information corresponding to the second characteristic pattern,
   wherein each characteristic pattern comprises a correspondence between an identifier of each wireless device in a corresponding space and a signal quality of the wireless device; and
   wherein performing the matching process to match the first characteristic pattern to at least one of the plurality of preset characteristic patterns comprises:
      comparing each of the plurality of preset characteristic patterns with the first characteristic pattern; and
      determining that the second characteristic pattern associated with a second space matches the first characteristic pattern, if the second characteristic pattern comprises identifiers of all the wireless devices in the current space and signal quality of the wireless devices in the first characteristic pattern is similar to that of wireless devices in the second characteristic pattern.

10. The storage medium of claim 9, wherein it is determined that the signal quality of the wireless devices in the first characteristic pattern is similar to that of wireless devices in the second characteristic pattern, if the signal quality of N wireless devices in the first characteristic pattern falls within a signal quality range of corresponding wireless devices in the second characteristic pattern, and N reaches a predesignated number.

11. The storage medium of claim 9, further comprising:
   collecting and analyzing, with respect to each of the plurality of spaces, wireless messages received from each wireless device to obtain a media access control (MAC) address and a received signal strength indicator (RSSI) of each wireless device; and
   creating a correspondence between the MAC address and RSSI of each wireless device to obtain the characteristic pattern for each space.

12. The storage medium of claim 11, wherein the wireless messages received from each wireless device are collected multiple times to obtain a multiple of RRSIs for each wireless device, and the multiple of RRSIs are grouped as a RRSI range for each wireless device.

* * * * *